United States Patent
Raghothaman

(10) Patent No.: US 11,375,473 B2
(45) Date of Patent: Jun. 28, 2022

(54) DETECTION OF A PHYSICAL MOVE OF A REMOTE UNIT OF A CENTRALIZED RADIO ACCESS NETWORK (C-RAN)

(71) Applicant: CommScope Technologies LLC, Hickory, NC (US)

(72) Inventor: Balaji B Raghothaman, Chester Springs, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/027,215

(22) Filed: Sep. 21, 2020

(65) Prior Publication Data
US 2021/0099971 A1 Apr. 1, 2021

Related U.S. Application Data

(60) Provisional application No. 62/907,403, filed on Sep. 27, 2019.

(51) Int. Cl.
*H04W 64/00* (2009.01)
*H04W 88/08* (2009.01)
*H04W 88/12* (2009.01)

(52) U.S. Cl.
CPC ........ *H04W 64/006* (2013.01); *H04W 88/085* (2013.01); *H04W 88/12* (2013.01)

(58) Field of Classification Search
CPC ..... H04W 76/10; H04W 76/27; H04W 76/20; H04W 88/08; H04W 40/12; H04W 72/0413; H04W 24/10; H04W 48/20; H04W 4/023; H04W 16/28; H04W 84/005; H04W 16/18; H04W 52/386; H04W 64/003
See application file for complete search history.

(56) References Cited

U.S. PATENT DOCUMENTS

| | | |
|---|---|---|
| 9,380,466 B2 | 6/2016 | Eyuboglu et al. |
| 9,414,399 B2 | 8/2016 | Eyuboglu et al. |
| 9,936,470 B2 | 4/2018 | Eyuboglu et al. |
| 9,998,310 B2 | 6/2018 | Barbieri et al. |
| 10,057,916 B2 | 8/2018 | Barabell et al. |
| 10,097,391 B2 | 10/2018 | Fertonani et al. |

(Continued)

FOREIGN PATENT DOCUMENTS

| | | |
|---|---|---|
| GB | 2452688 A | 3/2009 |
| KR | 20170028974 A | 3/2017 |

(Continued)

OTHER PUBLICATIONS

Haberland et al., "Base Stations in the Cloud", ITG Fachtagung Wien, Sep. 28, 2012, pp. 1 through 23, Alcatel Lucent.

(Continued)

*Primary Examiner* — Kwasi Karikari
(74) *Attorney, Agent, or Firm* — Fogg & Powers LLC

(57) ABSTRACT

Techniques for determining if a given remote unit of a centralized radio access network (C-RAN) has physically moved are disclosed. This can be done, for example, by determining signal reception metrics for other remote units in the C-RAN based on at least one transmission associated with the given remote unit and determining if the given remote unit has physically moved as a function of the signal reception metrics for the other remote units.

22 Claims, 3 Drawing Sheets

(56) References Cited

U.S. PATENT DOCUMENTS

Figure 1:
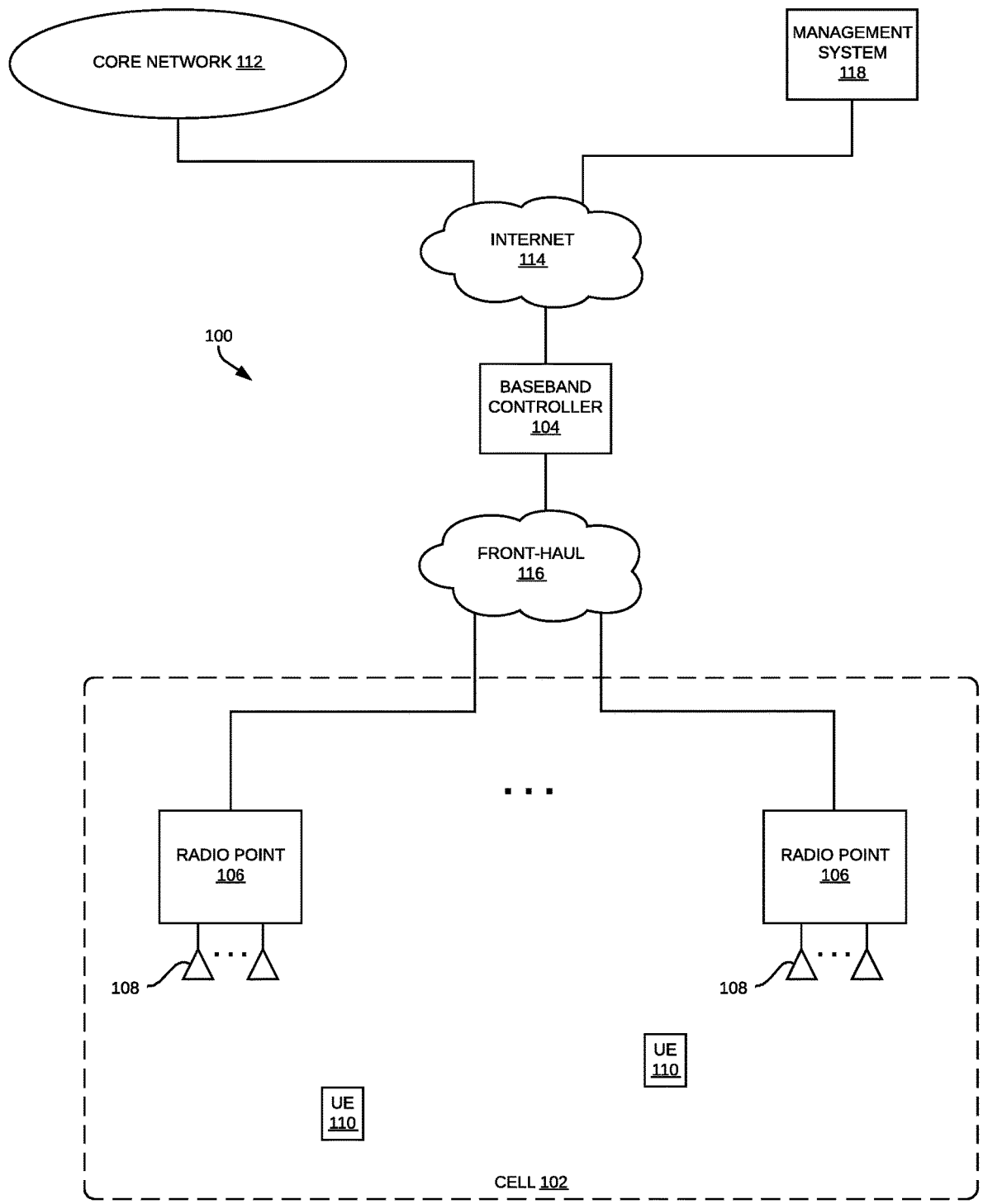

| | | | |
|---|---|---|---|
| 10,355,895 B2 | 7/2019 | Barbieri et al. | |
| 2016/0380351 A1* | 12/2016 | Simmonds | H01Q 3/08 |
| | | | 342/359 |
| 2017/0373890 A1 | 12/2017 | Fertonani et al. | |
| 2018/0287696 A1* | 10/2018 | Barbieri | H04W 36/22 |
| 2019/0007246 A1 | 1/2019 | Fertonani et al. | |
| 2019/0116568 A1 | 4/2019 | Fertonani et al. | |
| 2019/0208575 A1 | 7/2019 | Barbieri et al. | |
| 2019/0230569 A1 | 7/2019 | Kim et al. | |

FOREIGN PATENT DOCUMENTS

| | | |
|---|---|---|
| KR | 20170028984 A | 3/2017 |
| KR | 20180087814 A | 8/2018 |
| WO | 2014076004 A2 | 5/2014 |
| WO | 2016145371 A2 | 9/2016 |
| WO | 2017070635 A1 | 4/2017 |
| WO | 2018017468 A1 | 1/2018 |
| WO | 2018017840 A1 | 1/2018 |
| WO | 2018175615 A1 | 9/2018 |
| WO | 2019006085 A1 | 1/2019 |

OTHER PUBLICATIONS

Zhu et al., "Virtual Base Station Pool: Towards a Wireless Network Cloud for Radio Access Networks", CF'10, May 2010, Bertinoro, Italy.
International Searching Authority, "International Search Report and Written Opinion from PCT Application No. PCT/US2020/051815", from Foreign Counterpart to U.S. Appl. No. 17/027,215, filed Dec. 30, 2020, pp. 1 through 10, Published: WO.

* cited by examiner

DETECTION OF A PHYSICAL MOVE OF A REMOTE UNIT OF A CENTRALIZED RADIO ACCESS NETWORK (C-RAN)

CROSS-REFERENCE TO RELATED APPLICATIONS

This application claims the benefit of U.S. Provisional Patent Application Ser. No. 62/907,403, filed on Sep. 27, 2019, which is hereby incorporated herein by reference in its entirety.

BACKGROUND

A centralized radio access network (C-RAN) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each baseband controller is coupled to the radio points over front-haul communication links or a front-haul network.

A radio point used in a C-RAN may be "moved" after initial installation. In general, there are two types of moves. One type of move (referred to here as a "network" move) is where the placement of the radio point with respect to the existing network topology changes (for example, where the radio point is connected to a different port of an Ethernet switch that is used to implement the fronthaul network). Another type of move (also referred to here as a "physical" move) is where the physical location of the radio point changes. The distance that a radio point is moved in a physical move can be large or small. A very large change in the location of a radio point (for example, a significant change in the Global Positioning Server (GPS) coordinates) may create issues if the associated wireless service provider is not licensed to operate in the new location. Other smaller changes in the location of a radio point may be large enough to create significant change in the radio frequency (RF) environment around the radio point, necessitating a change in the RF planning for the associated C-RAN. The wireless service provider typically carefully develops the RF plan for the site at which a C-RAN is deployed and typically is very interested in any events (such as a physical move of a radio point) that may impact that RF plan and the resulting RF environment.

SUMMARY

One embodiment is directed to a system comprising a baseband controller to communicatively couple the system to a core network and a plurality of radio points to wirelessly transmit and receive radio frequency signals to and from user equipment using a wireless interface. Each of the radio points is associated with at least one antenna and located remotely from the controller. The system is configured to determine if a given radio point has physically moved by: determining signal reception metrics for the other radio points based on at least one transmission associated with the given radio point and determining if the given radio point has physically moved as a function of the signal reception metrics for the other radio points.

Another embodiment is directed to a system comprising a baseband controller to communicatively couple the system to a core network and a plurality of radio points to wirelessly transmit and receive radio frequency signals to and from user equipment using a wireless interface. Each of the radio points is associated with at least one antenna and located remotely from the controller. The system is configured to successively performing the following process for each given radio point: determine a respective neighborhood vector for the given radio point, each respective neighborhood vector including, for each of the other radio points, a respective signal reception metric determined for that other radio point based on the reception of the at least one transmission associated with the given radio point at that other radio point; determine a respective change vector for the given radio point, each respective change vector including, for each of the other radio points, a respective change value indicative of a change between the respective signal reception metric value in the most-recent neighborhood vector and the respective signal reception metric value in the second-most-recent neighborhood vector; determine a respective move quotient for the given radio point; and determine if the given radio point has physically moved as a function of the respective move quotient for the given radio point. Each respective move quotient for a given radio point is determined by: determining a subset of the other radio points that the second-most-recent neighborhood vector indicates are nearby the given radio point; determining, for each of the other radio points in said subset, if the respective change value in the change vector exceeds a move threshold; and determining the respective move quotient for the given radio point as a function of how many of the other radio points included in said subset have a respective change value in the change vector that exceeds the move threshold.

Another embodiment is directed to a method of determining if a given radio point has physically moved in a system comprising a baseband controller to communicatively couple the system to a core network and a plurality of radio points to wirelessly transmit and receive radio frequency signals to and from user equipment using a wireless interface. Each of the radio points is associated with at least one antenna and located remotely from the controller. The method comprises determining signal reception metrics for the other radio points based on at least one transmission associated with the given radio point and determining if the given radio point has physically moved as a function of the signal reception metrics for the other radio points.

Another embodiment is directed to a method of determining a physical move of a radio point in a system comprising a baseband controller to communicatively couple the system to a core network and a plurality of radio points to wirelessly transmit and receive radio frequency signals to and from user equipment using a wireless interface. Each of the radio points is associated with at least one antenna and located remotely from the controller. The method comprises successively performing the following for each given radio point: determining a respective neighborhood vector for the given radio point, each respective neighborhood vector including, for each of the other radio points, a respective signal reception metric determined for that other radio point based on the reception of the at least one transmission associated with the given radio point at that other radio point; determining a respective change vector for the given radio point, each respective change vector including, for each of the other radio points, a respective change value indicative of a change between the respective signal reception metric value in the most-recent neighborhood vector and the respective signal reception metric value in the second-most-recent neighborhood vector; determining a respective move quotient for the given radio point; and determining if the given radio point has physically moved as a function of the respective move quotient for the given radio point. Each respective move quotient for a given radio point is determined by: determining a subset of the other radio points that the second-most-recent neighborhood vector indicates are nearby the given radio point; determining, for each of the other radio points in said subset, if the respective change value in the change vector exceeds a move threshold; and determining the respective move quotient for the given radio point as a function of how many of the other radio points included in said subset have a respective change value in the change vector that exceeds the move threshold.

Other embodiments are disclosed.

The details of various embodiments are set forth in the accompanying drawings and the description below. Other features and advantages will become apparent from the description, the drawings, and the claims.

DRAWINGS

FIG. 1 is a block diagram one embodiment of a C-RAN in which the remote-unit move-detection techniques described below can be implemented.

Figure 2:
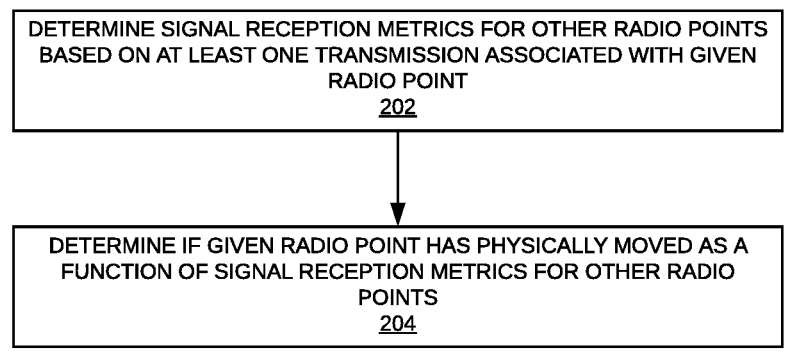

FIG. 2 comprises a high-level flowchart illustrating one exemplary embodiment of a high-level method of detecting a physical move of a radio point used in a C-RAN.

Figure 3:
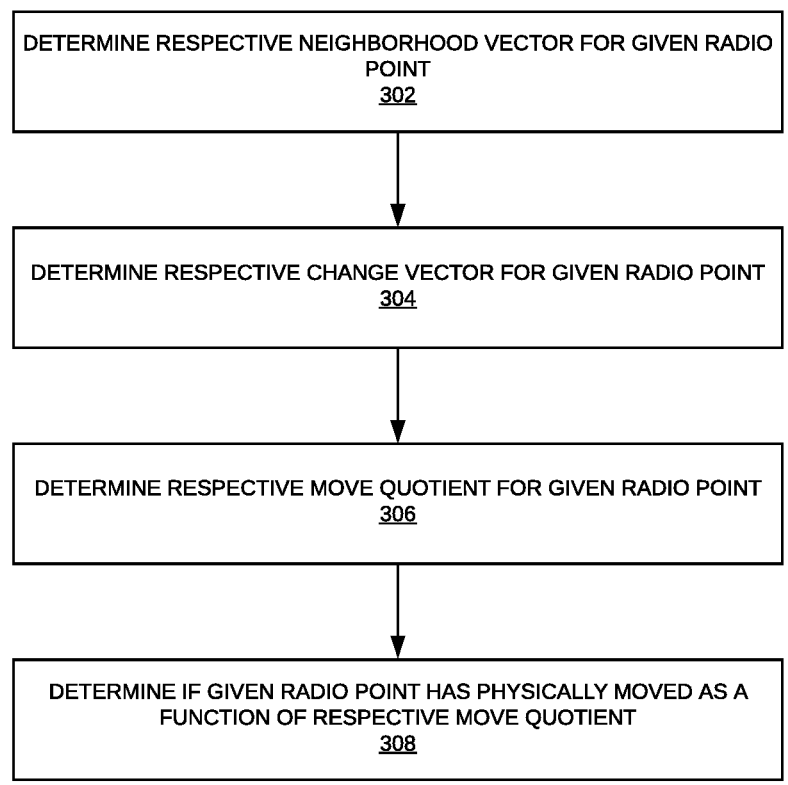

FIG. 3 comprises a high-level flowchart illustrating one exemplary embodiment of a method of detecting a physical move of a radio point used in a C-RAN.

Like reference numbers and designations in the various drawings indicate like elements.

DETAILED DESCRIPTION

FIG. 1 is a block diagram one embodiment of a C-RAN 100 in which the remote-unit move-detection techniques described below can be implemented.

The C-RAN 100 (also referred to here as a "C-RAN system" 100 or just "system" 100) comprises, for each cell 102 served by the C-RAN 100, a baseband controller 104 and multiple radio points (RPs) 106.

Each RP 106 is remotely located from the baseband unit 104. Also, in this exemplary embodiment, at least one of the RPs 106 is remotely located from at least one other RP 106. Each RP 106 includes or is coupled to one or more antennas 108 via which downlink RF signals are radiated to various items of user equipment (UE) 110 and via which uplink RF signals transmitted by UEs 110 are received.

The system 100 is coupled to a core network 112 of the associated wireless network operator over an appropriate back-haul. In the exemplary embodiment shown in FIG. 1, the Internet 114 is used for the back-haul between the system 100 and the core network 112. However, it is to be understood that the back-haul can be implemented in other ways.

Also, each baseband controller 104 is communicatively coupled to the radio points 106 served by it using a front-haul network 116. The baseband controllers 104 and the radio points 106 include one or more network interfaces (not shown) in order to enable the baseband controllers 104 and radio points 106 to communicate over the front-haul network 116.

In one implementation, the front-haul 116 that communicatively couples each baseband controller 104 to the RPs 106 is implemented using a switched ETHERNET network. In such an implementation, each baseband controller 104 and radio point 106 includes one or more ETHERNET interfaces for communicating over the switched ETHERNET network used for the front-haul 116. However, it is to be understood that the front-haul between each baseband controller 104 and the RPs 106 served by it can be implemented in other ways.

Generally, for each cell 102 implemented by the C-RAN 100, the corresponding based controller 104 serving the cell 102 performs the LAYER-3 and LAYER-2 functions for the particular wireless interface used for that cell 102. Also, for each cell 102 implemented by the C-RAN 100, the corresponding based controller 104 serving the cell 102 can perform some of the LAYER-1 functions for the particular wireless interface used for that cell 102. Each of the radio points 106 serving that cell 102 perform any LAYER-1 functions not performed by the baseband controller 104 as well as implementing the analog RF transceiver functions.

Different splits in the wireless-interface functions between each baseband controller 104 and the radio points 106 can be used. Also, the functional split used for downlink communications (that is, communications transmitted to the UEs 110) can differ from the functional split used for uplink communications (that is, communications received from the UEs 110). Also, for a given direction (downlink or uplink), the same functional split does not need to be used for all front-haul data communicated in that direction. For example, different functional splits can be used for different channels or different resource blocks.

The description of the C-RAN 100 set forth above is consistent with an implementation used to support the Fourth Generation (4G) Long-Term Evolution (LTE) family of standards. The C-RAN 100 can also be used in implementations that also support the Fifth Generation (5G) New Radio (NR) family of standards (including both standalone and non-standalone configurations). In 5G NR implementations, the functions of each baseband controller 104 can be partitioned into at least one Central Unit (CU) and at least one Distributed Unit (DU) in order to implement the CU and DU functions described in the 5G NR family of standards. Also, in 5G NR implementations, the radio points 106 can implement the remote unit (RU) functions described in the 5G NR family of standards. In such 5G NR implementations, the baseband controller 104 can also be referred to as a CU or DU, and the radio points 106 can also be referred to as remote units 106 or RUs 106.

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

In the exemplary embodiment shown in FIG. 1, a management system 118 is communicatively coupled to the controllers 104 and RPs 106, for example, via the Internet 114 and front-haul switched ETHERNET network 116 (in the case of the RPs 106).

In the exemplary embodiment described here in connection with FIG. 1, a "signature vector" (SV) is determined for each UE 110. The signature vector is determined based on received power measurements made at each of the RPs 106. When a UE 110 makes initial LTE or 5G NR Physical Random Access Channel (PRACH) transmissions to access a cell 102 served by the C-RAN 100, one or more RPs 106 will receive those initial PRACH transmissions. Each RP 106 is configured to detect uplink PRACH transmissions that it has received (that is, each RP 106 is configured to detect when UEs 110 are attempting to access the associated cell 102) and make received power measurements for those PRACH transmissions. A signal reception metric indicative of the received power level of the received PRACH transmission as received by that RP 106 from that UE 110 is determined based on the received power measurements. The signal reception metrics that are determined based on the PRACH transmissions are also referred to here as "PRACH metrics." The initial version of the signature vector for each UE 110 is created based on the PRACH metrics for that UE 110. This initial version of the signature vector fora UE 110 is also referred to here as the "PRACH signature vector" for that UE 110.

The signature vector for each UE 110 is updated over the course of that UE's connection to the cell 102 based on Sounding Reference Signals (SRS) transmitted by each UE 110. Each RP 106 is configured to make received power measurements for the SRS transmissions from each UE 110. A signal reception metric indicative of the power level of the SRS transmissions received by the RPs 106 from each UE 110 based on the received power measurements is determined. The signal reception metrics that are determined based on the SRS transmissions are also referred to here as "SRS metrics." The updated versions of the signature vector for each UE 110 are created based on the SRS metrics for that UE 110. Each of these updated versions of the signature vector for a UE 110 is also referred to here as the "functional signature vector" for that UE 110.

The signature vector can be used to determine the RP 106 having the best signal reception metric by scanning or sorting the elements of the signature vector to find the element having the best signal reception metric. The RP 106 that corresponds to that "best" element is also referred to here as the "primary RP 106" for the UE 110.

FIG. 2 comprises a high-level flowchart illustrating one exemplary embodiment of a high-level method 200 of detecting a physical move of a radio point 104 used in a C-RAN. The embodiment of method 200 shown in FIG. 2 is described here as being implemented for use in the C-RAN 100 described above in connection with FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 is successively performed for each given radio point 106.

Method 200 comprises determining signal reception metrics for the other radio points 106 based on at least one transmission associated with the given radio point 106 (block 202) and determining if the given radio point 106 has physically moved as a function of the signal reception metrics for the other radio points 106 (block 204). The at least one transmission associated with the given radio point 106 can, for example, comprise at least one transmission made by the given radio point 106 itself and/or at least one transmission made by each UE 110 associated with that given radio point 106 (for example, each UE 110 that is very close to the given radio point 106).

In one implementation, for each given radio point 106, signal reception metrics for the other radio points 106 based on at least one transmission associated with the given radio point 106 are made at successive points in time. Provided there has been no change in the location of the given radio point 106 or the RF environment, it is expected that the signal reception metrics for the other radio points 106 that are closest to the given radio point 106 (the "nearby" radio points 106) will not change substantially from one determination of the signal reception metrics to the next. If a significant number of the signal reception metrics for the nearby radio points 106 change substantially from one determination of the signal reception metrics to the next, there is a high probability that the given radio point 106 has physically moved or the RF environment associated with that given radio point 106 has otherwise changed significantly (for example, due to some other physical change such as a new barrier being installed or an existing barrier being removed). This fact can be signaled to the management system 118 (in response to which, for example, the wireless service provider can send a technician to the site where the given radio point 106 should be located in order to investigate).

Examples of detailed implementations of method 200 are described below in connection with FIG. 3 (for example, embodiments of method 200 can be implemented using the NLM approach and/or the UE-based approach described below in connection with FIG. 3).

FIG. 3 comprises a high-level flowchart illustrating one exemplary embodiment of a method 300 of detecting a physical move of a radio point 104 used in a C-RAN. The embodiment of method 300 shown in FIG. 3 is described here as being implemented for use in the C-RAN 100 described above in connection with FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

Method 300 is successively performed for each given radio point 106.

Method 300 comprises determining a respective neighborhood vector for the given radio point 106 (block 302). The neighborhood vector comprises a set of elements, one for each radio point 106. Each element comprises a respective signal reception metric determined for at least one transmission associated with the given radio point 106 based on measurements made at the associated other radio point 106.

One implementation uses a "Neighbor Listen Mechanism" (NLM) to determine the neighborhood vector for each radio point 106. The NLM is a process that is performed periodically (for example, once a day during a low-usage time). The NLM process is performed for each radio point 106. When the NLM process is performed for a given radio point 106, that given radio point 106 is configured to make predetermined transmissions and the other radio points 106 are configured to receive those transmissions, measure the received power for each of the received transmissions (for example, in decibel-milliwatts (dBm)), and determine a signal reception metric based on the received power measurements. The signal reception metric can be, for example, an average received power (Rx) or an average path loss (PL). Other signal reception metrics can be used. Regardless of the signal reception metric being used, the impact of any beamforming should be taken into consideration in determining the signal reception metrics.

In an implementation that uses the NLM to determine the neighborhood vector for each radio point 106, the "at least one transmission associated with the given radio point 106" comprise the predetermined transmissions made by the given radio point 106 when the NLM process is performed for that given radio point 106.

More formally, where the signal reception metric comprises an average received power (Rx) for each given radio point $RP_i$, the neighborhood vector can be expressed as $Rx_i = [Rx_{1,i}, Rx_{2,i}, \ldots, 0, \ldots, Rx_{n,i}]$, where $Rx_{j,i}$ represents the average received power (in dBm) measured at radio point $RP_j$ for the NLM transmissions made by the given radio point $RP_i$ and n represents the number of radio points 106. Note that the "0" in the neighborhood vector $Rx_i$ represents the element associated with the given radio point $RP_i$ and is 0 because that value represents the self-receive power case.

Likewise, where the signal reception metric comprises an average power loss (PL) for each given radio point $RP_i$, the neighborhood vector can be expressed as $PL_i = [PL_{1,i}, PL_{2,i}, \ldots, 0, \ldots, PL_{n,i}]$, where $PL_{j,i}$ represents the average power loss measured at radio point $RP_j$ for the NLM transmissions made by the given radio point $RP_i$ and n represents the number of radio points 106. Note that the "0" in the neighborhood vector $PL_i$ represents the element associated with the given radio point $RP_i$ and is 0 because that value represents the self-receive power case.

Another implementation is UE based and uses the signature vectors that are otherwise generated for the UEs 110 served by the cell 102. The signature vectors are used to determine the neighborhood vector for each radio point 106. As noted above, the current signature vector for each UE 110 includes a reception metric for each radio point 106 that is determined from received power measurements made at that radio point 106.

In such a UE-based implementation, for each given radio point 106, the current signature vectors for the UEs 110 served by the cell 102 are filtered in order to determine the UEs 110 that are very close to the given radio point 106 (for example, within one meter of the given radio point 106). This can be done by determining a signal reception metric from the received power measurements for the given radio point 106 used to generate the current signature vector for each UE 110 and comparing the signal reception metric to a predetermined proximity threshold. The proximity threshold can be selected to correspond to the outer limit of where a UE 110 would be considered to be very close to the radio point 106. For example, if the signal reception metric comprises a path loss value, a UE 110 is considered to be very close to a given radio point 106 if the path loss value determined for the given radio point 106 for that UE 110 is less than the proximity threshold (which is a threshold path loss value in this example). (If pass loss is used, the impact of any beamforming should be taken into consideration in determining path loss.) If the signal reception metric comprises a received power value, a UE 110 is considered to be very close to a given radio point 106 if the received power value determined for the given radio point 106 for the UE 110 is greater than the proximity threshold (which is a threshold received power value in this example).

After the UEs 110 that are very close to a given radio point 106 are determined, the neighborhood vector for the given radio point 106 is determined from the received power measurements used to generate the current signature vectors for those UEs 110. Each signal reception metric included in the neighborhood vector can be, for example, an average received power (in which case the neighborhood vector can be expressed as the vector $Rx_i$ as described above) or an average path loss (in which case the neighborhood vector can be expressed as the vector $PL_i$ as described above). Other signal reception metrics can be used.

In a UE-based implementation, the "at least one transmission associated with the given radio point 106" comprise the transmissions made by the UEs 110 that are used to generate the signature vectors for those UEs 110.

Method 300 further comprises determining a respective change vector for the given radio point 106 (block 304). The change vector comprises a set of elements, one for each radio point 106, where each element comprises the absolute value of the difference between the respective signal reception metric for that radio point 106 in the most-recent neighborhood vector and the respective signal reception metric for that radio point 106 in the second-most-recent neighborhood vector.

More formally, where the signal reception metric comprises an average received power (Rx) for each given radio point $RP_i$, the change vector can be expressed as: $\Delta Rx_i = |Rx_i(t) - Rx_i(t-1)|$, where $Rx_i(t)$ is the neighborhood vector at time t (that is, $Rx_i(t)$ is the most-recent neighborhood vector) and $Rx_i(t-1)$ is the neighborhood vector at time t−1 (that is, $Rx_i(t-1)$ is the second-most-recent neighborhood vector).

Likewise, where the signal reception metric comprises an average path loss (PL) for each given radio point $RP_i$, the neighborhood vector can be expressed as $\Delta PL_i = |PL_i(t) - PL_i(t-1)|$, where $PL_i(t)$ is the neighborhood vector at time t (that is, $PL_i(t)$ is the most-recent neighborhood vector) and $PL_i(t-1)$ is the neighborhood vector at time t−1 (that is, $PL_i(t-1)$ is the second-most-recent neighborhood vector).

Method 300 further comprises determining a respective move quotient for the given radio point 106 (block 306). The move quotient for the given radio point 106 can be determined by first determining a set of other radio points 106 that are nearby the given radio point 106. The set of nearby other radio points 106 can be determined using the second-most-recent neighborhood vector. A radio point 106 is nearby the given radio point 106 if the signal reception metric for that radio point 106 included in the second-most-recent neighborhood vector is better than a proximity threshold. The proximity threshold can be selected to correspond to the outer limit of where a radio point 106 would be considered to be nearby the given radio point 106. For example, if the signal reception metric comprises a path loss value, a path loss value is better than the proximity threshold if the path loss value is less than the proximity threshold (which is a threshold path loss value in this example). If the signal reception metric comprises a received power value, a received power loss value is better than the proximity threshold if the received power value is greater than the proximity threshold (which is a threshold received power value in this example).

Then, for each of the nearby radio points 106, it is determined if the change value for that nearby radio point 106 in the change vector exceeds a move threshold. In one example, the move threshold can be selected to correspond to the outer limit of where a change value can be considered to be significant and indicative of a situation where there is a significant change in the relative distance between the given radio point 106 and that nearby radio point 106 or a significant change in the RF environment associated with the path between the given radio point 106 and that nearby radio point 106. In another example, the move threshold can be determined on a radio-point-by-radio-point basis as a function of the signal reception metric included in the second-most-recent neighborhood vector for each nearby radio point 106 (for example, where lower move thresholds are used for radio points 106 that were nearer the given radio point 106 when the second-most-recent neighborhood vector was determined).

The move quotient for a given radio point 106 can then be calculated as the ratio of the number of nearby radio points 106 for that given radio point 106 that have a change value that exceeds the respective move threshold and the total number of nearby radio points 106 for that given radio point 106.

Method 300 further comprises determining if the given radio point 106 has physically moved as a function of the respective move quotient determined for the given radio point 106 (block 308). In general, if a given radio point 106 has been physically moved to a new location that is significantly far away from its previous location, a large number of the nearby radio points 106 for that given radio point 106 will have a change value that exceeds the move threshold. Thus, the larger the move quotient for a given radio point 106, the more likely it is to be the case that the given radio point 106 has physically moved. A threshold value for the move quotient value can be used. For example, if the move quotient exceeds the threshold, that fact can be signaled to the management system 118 (in response to which, for example, the wireless service provider can send a technician to the site where the given radio point 106 should be located in order to investigate).

As a result of performing method 300 for a given radio point 106, if it is determined that only one other radio point 106 has a change value that exceeds the move threshold, this could indicate that the other radio point 106 (not the given radio point 106 for which method 300 was performed) has been physically moved.

Other embodiments and implementations can be implemented in other ways. For example, although the description set forth above refers to controllers 104 and radio points 106, it is to be understood that the techniques described here can be used in both 4G LTE and 5G NR embodiments, in the latter case references to a baseband controller 104 can be replaced with references to a central unit and/or a distributed unit and references to radio points 106 can be replaced with references to remote units.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system comprising: a baseband controller to communicatively couple the system to a core network; and a plurality of radio points to wirelessly transmit and receive radio frequency signals to and from user equipment using a wireless interface, each of the radio points associated with at least one antenna and located remotely from the controller; wherein the system is configured to determine if a given radio point has physically moved by: determining signal reception metrics for the other radio points based on at least one transmission associated with the given radio point; and determining if the given radio point has physically moved as a function of the signal reception metrics for the other radio points.

Example 2 includes the system of Example 1, wherein the radio point comprises a 5G NR remote unit and the base controller comprises one or more of a 5G NR central unit and a 5G NR distributed unit.

Example 3 includes the system of any of Examples 1-2, wherein the radio point comprises a 4G LTE radio point and the baseband controller comprises a 4G LTE baseband controller.

Example 4 includes a system comprising: a baseband controller to communicatively couple the system to a core network; and a plurality of radio points to wirelessly transmit and receive radio frequency signals to and from user equipment using a wireless interface, each of the radio points associated with at least one antenna and located remotely from the controller; wherein the system is configured to successively performing the following process for each given radio point: determine a respective neighborhood vector for the given radio point, each respective neighborhood vector including, for each of the other radio points, a respective signal reception metric determined for that other radio point based on the reception of the at least one transmission associated with the given radio point at that other radio point; determine a respective change vector for the given radio point, each respective change vector including, for each of the other radio points, a respective change value indicative of a change between the respective signal reception metric value in the most-recent neighborhood vector and the respective signal reception metric value in the second-most-recent neighborhood vector; determine a respective move quotient for the given radio point by: determining a subset of the other radio points that the second-most-recent neighborhood vector indicates are nearby the given radio point; determining, for each of the other radio points in said subset, if the respective change value in the change vector exceeds a move threshold; and determining the respective move quotient for the given radio point as a function of how many of the other radio points included in said subset have a respective change value in the change vector that exceeds the move threshold; and determine if the given radio point has physically moved as a function of the respective move quotient for the given radio point.

Example 5 includes the system of Example 4, wherein the at least one transmission associated with the given radio point comprises at least one transmission made from the given radio point; and wherein the signal reception metric determined for each other radio point based on the reception of the at least one transmission associated with the given radio point at that other radio point comprises a received power measurement made at that other radio point for the at least one transmission made from the given point.

Example 6 includes the system of Example 5, wherein the respective neighborhood vector for the given radio point is determined using a Neighbor Listen Mechanism (NLM) process.

Example 7 includes the system of any of Examples 4-6, wherein the at least one transmission associated with the given radio point comprises transmissions made from user equipment that is very close to the given radio point; wherein the signal reception metric for each of the other radio points determined for the at least the transmission associated with the given radio point is determined using current signature vectors determined for the user equipment that is very close to the given radio point.

Example 8 includes the system of any of Examples 4-7, wherein the signal reception metric for each of the other radio points determined for the at least the transmission associated with the given radio point comprises at least one of: a received power and a path loss.

Example 9 includes the system of Example 8, wherein the impact of any beamforming is taken into consideration in determining the path loss.

Example 10 includes the system of any of Examples 4-9, wherein the radio point comprises a 5G NR remote unit and the base controller comprises one or more of a 5G NR central unit and a 5G NR distributed unit.

Example 11 includes the system of any of Examples 4-10, wherein the radio point comprises a 4G LTE radio point and the baseband controller comprises a 4G LTE baseband controller.

Example 12 includes a method of determining if a given radio point has physically moved in a system comprising a baseband controller to communicatively couple the system to a core network; and a plurality of radio points to wirelessly transmit and receive radio frequency signals to and from user equipment using a wireless interface, each of the radio points associated with at least one antenna and located remotely from the controller, the method comprising: determining signal reception metrics for the other radio points based on at least one transmission associated with the given radio point; and determining if the given radio point has physically moved as a function of the signal reception metrics for the other radio points.

Example 13 includes the method of Example 12, wherein the radio point comprises a 5G NR remote unit and the base controller comprises one or more of a 5G NR central unit and a 5G NR distributed unit.

Example 14 includes the method of any of Examples 12-13, wherein the radio point comprises a 4G LTE radio point and the baseband controller comprises a 4G LTE baseband controller.

Example 15 includes a method of determining a physical move of a radio point in a system comprising a baseband controller to communicatively couple the system to a core network; and a plurality of radio points to wirelessly transmit and receive radio frequency signals to and from user equipment using a wireless interface, each of the radio points associated with at least one antenna and located remotely from the controller, the method comprising: successively performing the following for each given radio point: determining a respective neighborhood vector for the given radio point, each respective neighborhood vector including, for each of the other radio points, a respective signal reception metric determined for that other radio point based on the reception of the at least one transmission associated with the given radio point at that other radio point; determining a respective change vector for the given radio point, each respective change vector including, for each of the other radio points, a respective change value indicative of a change between the respective signal reception metric value in the most-recent neighborhood vector and the respective signal reception metric value in the second-most-recent neighborhood vector; determining a respective move quotient for the given radio point by: determining a subset of the other radio points that the second-most-recent neighborhood vector indicates are nearby the given radio point; determining, for each of the other radio points in said subset, if the respective change value in the change vector exceeds a move threshold; and determining the respective move quotient for the given radio point as a function of how many of the other radio points included in said subset have a respective change value in the change vector that exceeds the move threshold; and determining if the given radio point has physically moved as a function of the respective move quotient for the given radio point.

Example 16 includes the method of Example 15, wherein the at least one transmission associated with the given radio point comprises at least one transmission made from the given radio point; and wherein the signal reception metric determined for each other radio point based on the reception of the at least one transmission associated with the given radio point at that other radio point comprises a received power measurement made at that other radio point for the at least one transmission made from the given point.

Example 17 includes the method of Example 16, wherein the respective neighborhood vector for the given radio point is determined using a Neighbor Listen Mechanism (NLM) process.

Example 18 includes the method of any of Examples 15-17, wherein the at least one transmission associated with the given radio point comprises transmissions made from user equipment that is very close to the given radio point; wherein the signal reception metric for each of the other radio points determined for the at least the transmission associated with the given radio point is determined using current signature vectors determined for the user equipment that is very close to the given radio point.

Example 19 includes the method of any of Examples 15-18, wherein the signal reception metric for each of the other radio points determined for the at least the transmission associated with the given radio point comprises at least one of: a received power and a path loss.

Example 20 includes the method of Example 19, wherein the impact of any beamforming is taken into consideration in determining the path loss.

Example 21 includes the method of any of Examples 15-20, wherein the radio point comprises a 5G NR remote unit and the base controller comprises one or more of a 5G NR central unit and a 5G NR distributed unit.

Example 22 includes the method of any of Examples 15-21, wherein the radio point comprises a 4G LTE radio point and the baseband controller comprises a 4G LTE baseband controller.

What is claimed is:
1. A system comprising:
 a baseband controller to communicatively couple the system to a core network; and
 a plurality of radio points to wirelessly transmit and receive radio frequency signals to and from user equipment using a wireless interface, each of the plurality of radio points associated with at least one antenna and located remotely from the baseband controller;

wherein the system is configured to determine if a given radio point of the plurality of radio points has physically moved by:

determining signal reception metrics for other radio points of the plurality of radio points based on reception of at least one transmission associated with the given radio point, wherein the other radio points are distinct from the given radio point; and determining if the given radio point has physically moved as a function of the signal reception metrics for the other radio points.

2. The system of claim 1, wherein each of the plurality of radio points comprises a 5G NR remote unit and the baseband controller comprises one or more of a 5G NR central unit and a 5G NR distributed unit.

3. The system of claim 1, wherein each of the plurality of radio points comprises a 4G LTE radio point and the baseband controller comprises a 4G LTE baseband controller.

4. A system comprising:
a baseband controller to communicatively couple the system to a core network; and
a plurality of radio points to wirelessly transmit and receive radio frequency signals to and from user equipment using a wireless interface, each of the plurality of radio points associated with at least one antenna and located remotely from the baseband controller;
wherein the system is configured to successively perform for each given radio point of the plurality of radio points:
determine a respective neighborhood vector for the given radio point, each respective neighborhood vector including, for each other radio point of the plurality of radio points, a respective signal reception metric determined for that other radio point based on reception of at least one transmission associated with the given radio point at that other radio point;
determine a respective change vector for the given radio point, each respective change vector including, for each of the other radio points, a respective change value indicative of a change between the respective signal reception metric in a most-recent neighborhood vector and the respective signal reception metric in a second-most-recent neighborhood vector;
determine a respective move quotient for the given radio point by:
determining a subset of the other radio points that the second-most-recent neighborhood vector indicates are nearby the given radio point;
determining, for each of the other radio points in said subset, if the respective change value in the respective change vector exceeds a move threshold; and
determining the respective move quotient for the given radio point as a function of how many of the other radio points included in said subset have a respective change value in the respective change vector that exceeds the move threshold; and
determine if the given radio point has physically moved as a function of the respective move quotient for the given radio point.

5. The system of claim 4, wherein the at least one transmission associated with the given radio point comprises at least one transmission made from the given radio point; and wherein the signal reception metric determined for each other radio point based on the reception of the at least one transmission associated with the given radio point at that other radio point comprises a received power measurement made at that other radio point for the at least one transmission made from the given radio point.

6. The system of claim 5, wherein the respective neighborhood vector for the given radio point is determined using a Neighbor Listen Mechanism (NLM) process.

7. The system of claim 4, wherein the at least one transmission associated with the given radio point comprises transmissions made from user equipment that is very close to the given radio point;

wherein the signal reception metric for each of the other radio points determined for the at least one transmission associated with the given radio point is determined using current signature vectors determined for the user equipment that is very close to the given radio point.

8. The system of claim 4, wherein the signal reception metric for each of the other radio points determined for the at least one transmission associated with the given radio point comprises at least one of: a received power and a path loss.

9. The system of claim 8, wherein an impact of any beamforming is taken into consideration in determining the path loss.

10. The system of claim 4, wherein the plurality of radio points comprises a 5G NR remote unit and the baseband controller comprises one or more of a 5G NR central unit and a 5G NR distributed unit.

11. The system of claim 4, wherein the plurality of radio points comprises a 4G LTE radio point and the baseband controller comprises a 4G LTE baseband controller.

12. A method of determining if a given radio point has physically moved in a system comprising a baseband controller to communicatively couple the system to a core network; and a plurality of radio points to wirelessly transmit and receive radio frequency signals to and from user equipment using a wireless interface, each of the plurality of radio points associated with at least one antenna and located remotely from the baseband controller, the method comprising:
determining signal reception metrics for other radio points of the plurality of radio points based on reception of at least one transmission associated with the given radio point, wherein the other radio points are distinct from the given radio point; and
determining if the given radio point has physically moved as a function of the signal reception metrics for the other radio points.

13. The method of claim 12, wherein the plurality of radio points comprises a 5G NR remote unit and the baseband controller comprises one or more of a 5G NR central unit and a 5G NR distributed unit.

14. The method of claim 12, wherein the plurality of radio points comprises a 4G LTE radio point and the baseband controller comprises a 4G LTE baseband controller.

15. A method of determining a physical move of a radio point in a system comprising a baseband controller to communicatively couple the system to a core network; and a plurality of radio points to wirelessly transmit and receive radio frequency signals to and from user equipment using a wireless interface, each of the plurality of radio points associated with at least one antenna and located remotely from the baseband controller, the method comprising:

successively performing for each given radio point of the plurality of radio points:

determining a respective neighborhood vector for the given radio point, each respective neighborhood vector including, for each other radio points of the plurality of radio points, a respective signal reception metric determined for that other radio point based on reception of at least one transmission associated with the given radio point at that other radio point;

determining a respective change vector for the given radio point, each respective change vector including, for each of the other radio points, a respective change value indicative of a change between the respective signal reception metric in a most-recent neighborhood vector and the respective signal reception metric in a second-most-recent neighborhood vector;

determining a respective move quotient for the given radio point by:

determining a subset of the other radio points that the second-most-recent neighborhood vector indicates are nearby the given radio point;

determining, for each of the other radio points in said subset, if the respective change value in the respective change vector exceeds a move threshold; and determining the respective move quotient for the given radio point as a function of how many of the other radio points included in said subset have a respective change value in the respective change vector that exceeds the move threshold; and determining if the given radio point has physically moved as a function of the respective move quotient for the given radio point.

16. The method of claim 15, wherein the at least one transmission associated with the given radio point comprises at least one transmission made from the given radio point; and wherein the signal reception metric determined for each other radio point based on reception of the at least one transmission associated with the given radio point at that other radio point comprises a received power measurement made at that other radio point for the at least one transmission made from the given radio point.

17. The method of claim 16, wherein the respective neighborhood vector for the given radio point is determined using a Neighbor Listen Mechanism (NLM) process.

18. The method of claim 15, wherein the at least one transmission associated with the given radio point comprises transmissions made from user equipment that is very close to the given radio point;

wherein the signal reception metric for each of the other radio points determined for the at least one transmission associated with the given radio point is determined using current signature vectors determined for the user equipment that is very close to the given radio point.

19. The method of claim 15, wherein the signal reception metric for each of the other radio points determined for the at least one transmission associated with the given radio point comprises at least one of: a received power and a path loss.

20. The method of claim 19, wherein an impact of any beamforming is taken into consideration in determining the path loss.

21. The method of claim 15, wherein the plurality of radio points comprises a 5G NR remote unit and the baseband controller comprises one or more of a 5G NR central unit and a 5G NR distributed unit.

22. The method of claim 15, wherein the plurality of radio points comprises a 4G LTE radio point and the baseband controller comprises a 4G LTE baseband controller.

* * * * *